May 19, 1925.
L. LINDSAY
1,538,292
DUST ERADICATOR FOR MOVING VEHICLES OR BUILDINGS
Filed Aug. 24, 1923
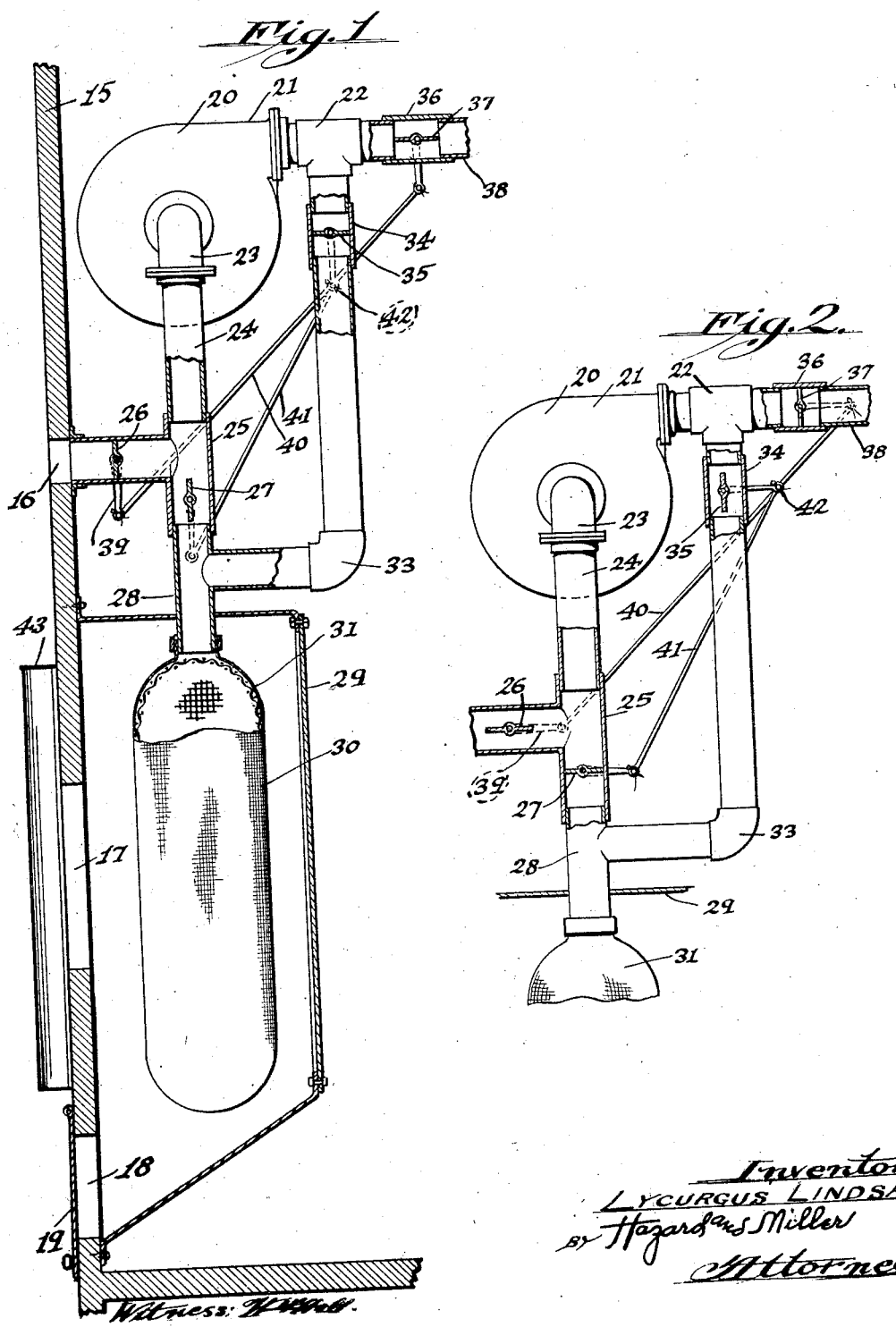

Patented May 19, 1925.

1,538,292

UNITED STATES PATENT OFFICE.

LYCURGUS LINDSAY, OF LOS ANGELES, CALIFORNIA.

DUST ERADICATOR FOR MOVING VEHICLES OR BUILDINGS.

Application filed August 24, 1923. Serial No. 659,142.

*To all whom it may concern:*

Be it known that I, LYCURGUS LINDSAY, a citizen of the United States, residing at Los Angeles, in the county of Los Angeles and State of California, have invented new and useful Improvements in Dust Eradicators for Moving Vehicles or Buildings, of which the following is a specification.

My invention relates to ventilators for cars or the like, and a purpose of my invention is the provision of an apparatus which operates to effect the ventilation of a car by injecting filtered air into the car and in such manner that drafts are created outwardly through the usual openings of a car so as to prevent the passage of dust and other foreign matter into the car through such openings.

It is also a purpose of my invention to provide an apparatus of the above described character including an air filter, and means by which a draft of air is created inwardly through the filter and subsequently injected into the car, or to create a draft of air outwardly through the filter in effecting a cleaning of the latter.

Although I have herein shown and will describe only one form of dust eradicating and ventilating apparatus embodying my invention, it is to be understood that various changes and modifications may be made herein without departing from the spirit of the invention and the spirit and scope of the appended claims.

In the accompanying drawings,

Fig. 1 is a view showing in side elevation and partly in section one form of apparatus embodying my invention in applied position with respect to the wall of a car.

Fig. 2 is a fragmentary view showing in side elevation and partly in section the apparatus shown in Fig. 1 but with the valves thereof in a different position than that shown in Fig. 1.

Referring specifically to the drawings in which similar reference characters refer to similar parts, my invention, in its present embodiment, is shown as applied to a wall 15 of a car or other form of vehicle, such wall being provided with openings 16, 17 and 18, the latter opening being controlled by a door 19. The apparatus formed in the subject matter of my invention, comprises a fan blower operated in any suitable manner and including a casing 20 having a tangential pipe extension 21 connected to a T 22 in any suitable manner. Extending centrally from the casing 20 is a down turned pipe connection 23 connected to a vertical pipe 24 which latter in turn is connected to a T 25. The horizontal portion of the T 25 is extended through the opening 16 in the wall 15 and is provided with a valve 26 for controlling the passage of air therethrough. The vertical portion of the T 25 below the side opening is likewise provided with a valve 27 which also operates to control the passage of air through such portion. The lower end of the vertical portion 25 is connected to a T 28, the lower end of which T extends into a housing 29 suitably secured to the wall 15 to enclose the openings 17 and 18. Within the housing 29 is arranged a filter including an elongated bag 30 of suitable fabric, and a foraminous body 31 interiorly of the bag 30 for maintaining the latter in extended position and at the same time allowing the free passage of air therethrough. The upper end of the filter is suitably connected to the lower end of the T 28, and may be solely supported by the T, if desired.

The horizontal portion of the T 28 is connected to a vertical pipe 32 through an elbow 33, and the upper end of the pipe 32 is connected to the T 22 through a pipe section 34, the latter being provided with a valve 35 for controlling the passage of air through the pipe section. The T 22 is connected to a pipe section 36 provided with a valve 37, and the pipe section 36 is connected to an air discharge pipe 38 which may extend to any suitable point within a car.

The valves 26, 27, 35 and 37 are all adapted to be operated simultaneously to occupy the relative positions shown in Fig. 1 or those shown in Fig. 2. To this end, the several valves are provided with arms 39 pivotally connected to rods 40 and 41, the latter being pivotally connected to each other, as indicated at 42, so that the movement of one rod effects corresponding movement of the other rod.

The operation of the apparatus is as follows: With the fan blower operating, a suction is created inwardly of the casing 20 through the pipe 23 and outwardly of the casing through the pipe 21. With the valves in the position shown in Fig. 1, the fan blower operates to create a draft of air inwardly through the opening 17 into the housing 29, and then through the filter into the pipe 28. The passage of air through the fabric bag 30 removes the dust and other foreign matter therefrom so that the latter is either deposited within the housing 29 or caused to adhere to the surface of the bag. The filtered air passes upwardly through the pipe 28, the vertical portion of the T 25, pipe section 24, and finally into the blower casing 20 through the pipe 23. From the latter the air is forced through the pipes 21, 22 and 36, and finally discharged into the car through the pipe 38.

In order to reduce the amount of foreign matter drawn into the housing 29, a dust eradicator 43 may be secured to the outer side of the wall 15 adjacent the opening 17.

After continued operation of the apparatus, the dust accumulating upon the surface of the bag 30 may be such as to prevent the proper draft of air through the bag. In such an event, the valves may be moved to the positions shown in Fig. 2 through manipulation of the rods 40 and 41 whereby air is supplied to the fan blower through the T 25 and discharged from the fan through the pipes 21 and 22 and downwardly through the pipes 32 and 28. This draft of air is introduced into the filter and outwardly through the fabric bag 30, thereby blowing dust and other foreign matter from the surface of the bag downwardly into the housing 29. This matter may be removed from the housing by opening the door 19, when the apparatus may again operate to supply air to the car upon movement of the valves back to the position shown in Fig. 1.

It is to be particularly noted that when filtered air under pressure is introduced into a car from the pipe 38, the possibility of drafts being created inwardly through the usual openings of the car is reduced to a minimum, thereby preventing the influx of dust and other foreign matter into the car through such openings.

What I claim is:

1. The combination with a wall having an upper opening and a lower opening, of a housing covering the lower opening, a blower mounted above the housing and having an intake pipe extending into the housing, an air filter in the housing connected to the intake pipe, a side branch leading from the upper opening into the intake pipe, a branch pipe leading from the outlet of the blower to the intake pipe, a discharge pipe leading from the blower, a valve in the intake pipe below the branch, a valve in the branch of the intake pipe, a valve in the branch of the discharge pipe, and a valve in the discharge pipe, so that when the valve in the intake pipe and the valve in the discharge pipe are open and the other valves closed and the blower operating, air will be drawn through the lower opening through the filter and blower and discharged through the discharge pipe, and so that when these valves are closed and the other valves open, air will be drawn through the blower and passed backwardly through the filter to remove the dust upon the filter.

2. The combination with a wall having an upper opening, an intermediate opening and a lower opening, of a housing covering the intermediate opening and the lower opening, a blower mounted above the housing and having an intake pipe extending into the housing, an air filter in the housing connected to the intake pipe, a side branch leading from the upper opening into the intake pipe, a branch pipe leading from the outlet of the blower to the intake pipe, a discharge pipe leading from the blower, a valve in the intake pipe below the branch, a valve in the branch of the intake pipe, a valve in the branch of the discharge pipe, and a valve in the discharge pipe, so that when the valve in the intake pipe and the valve in the discharge pipe are open and the other valves closed and the blower operating, air will be drawn through the lower opening through the filter and blower and discharged through the discharge pipe, and so that when these valves are closed and the other valves open, air will be drawn through the blower and passed backwardly through the filter to remove the dust upon the filter, and the dust may be removed through the lower opening.

3. The combination with a wall having an upper opening, an intermediate opening and a lower opening, a door over the lower opening and an air filter over the intermediate opening, of a housing covering the intermediate opening and the lower opening, a blower mounted above the housing and having an intake pipe extending into the housing, an air filter in the housing connected to the intake pipe, a side branch leading from the upper opening into the intake pipe, a branch pipe leading from the outlet of the blower to the intake pipe, a discharge pipe leading from the blower, a valve in the intake pipe below the branch, a valve in the branch of the intake pipe, a valve in the branch of the discharge pipe, and a valve in the discharge pipe, so that when the valve in the intake pipe and the valve in the discharge pipe are open and the other valves closed and the blower operating, air will be drawn through the lower opening through the filter and blower and discharged through the discharge pipe, and so that when these valves are closed and the other valves open, air will be drawn through the blower and passed backwardly through the filter to remove the dust upon the filter, and the dust may be removed through the lower opening.

In testimony whereof I have signed my name to this specification.

L. LINDSAY.